United States Patent
Chow et al.

(10) Patent No.: US 10,544,248 B2
(45) Date of Patent: Jan. 28, 2020

(54) CROSSLINKABLE RESIN COMPOSITION, CROSSLINKED PRODUCT, AND METHOD FOR PRODUCING THEREOF, AND MULTILAYERED STRUCTURE

(71) Applicant: KURARAY CO., LTD., Okayama (JP)

(72) Inventors: Edgard Chow, Houston, TX (US); Robert Armstrong, Houston, TX (US); Kentaro Yoshida, Houston, TX (US)

(73) Assignee: KURRAY CO., LTD, Okayama (JP)

( * ) Notice: Subject to any disclaimer, the term of this patent is extended or adjusted under 35 U.S.C. 154(b) by 419 days.

(21) Appl. No.: 15/625,474

(22) Filed: Jun. 16, 2017

(65) Prior Publication Data

US 2017/0369613 A1 Dec. 28, 2017

Related U.S. Application Data

(60) Provisional application No. 62/354,533, filed on Jun. 24, 2016.

(51) Int. Cl.
| | |
|---|---|
| *B32B 1/02* | (2006.01) |
| *C08F 216/06* | (2006.01) |
| *C08K 9/12* | (2006.01) |
| *C08K 9/08* | (2006.01) |
| *C08K 5/29* | (2006.01) |
| *B32B 1/08* | (2006.01) |
| *C08K 9/06* | (2006.01) |
| *C08K 9/04* | (2006.01) |
| *C08K 5/3492* | (2006.01) |
| *C09J 175/04* | (2006.01) |

(52) U.S. Cl.
CPC .............. *C08F 216/06* (2013.01); *B32B 1/02* (2013.01); *B32B 1/08* (2013.01); *C08K 5/29* (2013.01); *C08K 5/3492* (2013.01); *C08K 9/04* (2013.01); *C08K 9/06* (2013.01); *C08K 9/08* (2013.01); *C08K 9/12* (2013.01); *C09J 175/04* (2013.01); *C08F 2800/10* (2013.01); *C08F 2810/20* (2013.01); *C09J 2205/114* (2013.01); *C09J 2429/006* (2013.01); *C09J 2475/00* (2013.01)

(58) Field of Classification Search
CPC ...... C08K 5/0025; C08K 5/29; C08K 5/3492; C08K 5/34924; C08K 9/04; C08K 9/06; C08K 9/08; C08K 9/12; B32B 1/02; C08F 216/06
See application file for complete search history.

*Primary Examiner* — Walter Aughenbaugh
(74) *Attorney, Agent, or Firm* — Oblon, McClelland, Maier & Neustadt, L.L.P.

(57) ABSTRACT

OBJECT
An object is to provide a resin composition capable of forming a crosslinked product that is excellent in hot water resistance and excellent in interlayer adhesiveness when formed into a multilayered structure.
SOLUTION
The resin composition contains an ethylene-vinyl alcohol copolymer (A) and a crosslinking agent (B) with the crosslinking agent (B) in an amount of 0.6 to 15 parts by mass relative to 100 parts by mass of the ethylene-vinyl alcohol copolymer (A), the crosslinking agent (B) being a powder obtained by impregnating a porous body (BS) with a crosslinkable compound (BL) having three or more polymerizable groups and a melting point of no greater than 40° C.

16 Claims, No Drawings

CROSSLINKABLE RESIN COMPOSITION, CROSSLINKED PRODUCT, AND METHOD FOR PRODUCING THEREOF, AND MULTILAYERED STRUCTURE

CROSS REFERENCE TO RELATED APPLICATIONS

This application claims priority to U.S. Application No. 62/354,533, filed Jun. 24, 2016, the disclosure of which is incorporated herein by reference in its entirety.

TECHNICAL FIELD

The present invention relates to a resin composition, a crosslinked product, and a method for producing the resin composition and the crosslinked product, and a multilayered structure.

BACKGROUND ART

Ethylene-vinyl alcohol copolymers (hereinafter, also merely referred to as "EVOH") have an extremely small amount of oxygen transmission in comparison with other plastics and exhibit favorable melt moldability, and therefore have been widely used as food packaging materials and other packaging materials. However, when packaging materials produced using EVOH are subjected to a retort treatment or used under high-temperature and high-humidity conditions for a long period of time, there have been cases of whitening or deformation of the packaging materials or a decrease in barrier properties of the packaging materials, and thus improvement in hot water resistance has been demanded.

As a strategy for improving the hot water resistance, various techniques have been proposed in which EVOH is crosslinked using an activated energy ray such as an electron beam. For example, Patent Literature 1 discloses a method for melting and kneading EVOH with triallyl cyanurate or triallyl isocyanurate used as a crosslinking agent and then crosslinking the EVOH by irradiation with an electron beam.

In addition, Patent Literature 2 discloses a procedure of adding a compound having two or more allyl ether groups to EVOH and crosslinking the EVOH by irradiation with an electron beam.

Further, Patent Literature 3 discloses a method for modifying EVOH with an epoxy compound having a double bond and an epoxy compound not having a double bond, and crosslinking at least a part of the resultant modified EVOH by irradiation with an electron beam.

Furthermore, Patent Literature 4 discloses a procedure of adding an amide compound having a plurality of double bonds to EVOH and crosslinking the EVOH by irradiation with an electron beam.

CITATIONS LIST

Patent Literatures

Patent Literature 1: JP S62-252409 A
Patent Literature 2: JP H09-234833 A
Patent Literature 3: WO 2007/123108 A
Patent Literature 4: WO 2011/111802 A

SUMMARY OF INVENTION

Technical Problems

A multilayer film obtained by laminating a film containing a crosslinked product of Patent Literature 1 or 2 is sometimes insufficient in interlayer adhesiveness and still has had room for improvement in hot water resistance. The crosslinked product of Patent Literature 3 requires a special extruder to modify EVOH and thus has a problem of lacking in versatility. Patent Literature 4 describes that a crosslinking agent is allowed to have a specific polar group and the SP value of the crosslinking agent is approximated to the SP value of EVOH to effectively suppress bleeding out of the crosslinking agent. The SP value of the EVOH, however, varies depending on, for example, an ethylene content, and therefore, the bleeding out of the crosslinking agent is not sufficiently suppressed depending on the type of EVOH used, causing a hygienic concern when the EVOH is formed into a packaging material.

The present invention has been made in view of the foregoing circumstances, and an object of the present invention is to provide a resin composition capable of forming a crosslinked product excellent in hot water resistance and excellent in interlayer adhesiveness when formed into a multilayered structure, without being limited depending on the type of EVOH used.

Solutions to Problems

The present inventors have conducted study to improve hot water resistance and have found that a crosslinkable compound having a specific chemical structure in terms of the type and symmetry of a functional group has a particularly high crosslinking effect for EVOH and improves the hot water resistance. Further, the present inventors have studied a cause of a decrease in interlayer adhesiveness when a resin composition containing EVOH is used for a multilayered structure and, as a result, have found that a crosslinkable compound that is a liquid at around room temperature easily bleeds out from EVOH to decrease the interlayer adhesiveness. In addition, the present inventors have found that such a crosslinkable compound is added to EVOH as a powder obtained by impregnating a porous body with the crosslinkable compound, so that the bleeding out can be effectively suppressed without remarkably decreasing a crosslinking effect. Thus, the invention has been completed. The invention that has been made to solve the problems described above are as follows.

(1) A resin composition containing EVOH (A) and a crosslinking agent (B) with the crosslinking agent (B) in an amount of 0.6 to 15 parts by mass relative to 100 parts by mass of the EVOH (A), the crosslinking agent (B) being a powder obtained by impregnating a porous body (BS) with a crosslinkable compound (BL) that has three or more polymerizable groups and a melting point of no greater than 40° C.;

(2) The resin composition according to (1), wherein the crosslinkable compound (BL) is a triazine derivative;

(3) The resin composition according to (1) or (2), wherein the crosslinkable compound (BL) has carbonyl groups as many as or more than the polymerizable groups;

(4) The resin composition according to any one of (1) to (3), wherein the crosslinkable compound (BL) contains triallyl isocyanurate;

(5) The resin composition according to any one of (1) to (4), wherein the porous body (BS) includes at least one selected from the group consisting of silica, alumina, diatom earth, and activated carbon;

(6) The resin composition according to any one of (1) to (5), wherein the crosslinking agent (B) has a mass ratio (BL)/(BS) between the crosslinkable compound (BL) and the porous body (BS) of 20/80 to 80/20;

(7) The resin composition according to any one of (1) to (6), further containing a hindered phenol compound (C) having an ester bond or an amide bond in an amount of 0.2 to 5 parts by mass relative to 100 parts by mass of the EVOH (A);

(8) The resin composition according to (7), wherein the hindered phenol compound (C) has an amide bond;

(9) The resin composition according to any one of (1) to (8), being for crosslinking with an activated energy ray;

(10) A crosslinked product obtained from the resin composition according to any one of (1) to (9);

(11) A film formed of the crosslinked product according to (10);

(12) A multilayered structure including a layer formed of the crosslinked product according to (10);

(13) The multilayered structure according to (12), further including a polyurethane type adhesive layer;

(14) A retort container including the multilayered structure according to (12) or (13);

(15) A method for producing the resin composition according to any one of (1) to (9), the method including:

a copolymerization step of copolymerizing ethylene with a vinyl ester to give an ethylene-vinyl ester copolymer;

a saponification step of saponifying the ethylene-vinyl ester copolymer to give EVOH (A); and a mixing step of mixing the EVOH (A) with a crosslinking agent (B) that is a powder obtained by impregnating a porous body (BS) with a crosslinkable compound (BL) having three or more polymerizable groups and a melting point of no greater than 40° C., to give a mixture; and

(16) A method for producing the crosslinked product according to (10), the method including:

a copolymerization step of copolymerizing ethylene with a vinyl ester to give an ethylene-vinyl ester copolymer;

a saponification step of saponifying the ethylene-vinyl ester copolymer to give EVOH (A);

a mixing step of mixing the EVOH (A) with a crosslinking agent (B) that is a powder obtained by impregnating a porous body (BS) with a crosslinkable compound (BL) having three or more polymerizable groups and a melting point of no greater than 40° C., to give a mixture; and a crosslinking step of irradiating the mixture obtained in the mixing step with an activated energy ray.

Advantageous Effects of Invention

A resin composition of the present invention is capable of forming a crosslinked product excellent in hot water resistance. In addition, a multilayered structure including the crosslinked product is excellent in interlayer adhesiveness.

MODE FOR CARRYING OUT INVENTION

<Resin Composition>

A resin composition of the present invention contains EVOH (A) and a crosslinking agent (B). In the resin composition, used as the crosslinking agent (B) is a powder obtained by impregnating a porous body (BS) with a crosslinkable compound (BL), so that a crosslinking reaction progresses stably and sufficiently to suppress bleeding out of the crosslinkable compound (BL) from a crosslinked product, providing the crosslinked product that is excellent in hot water resistance and interlayer adhesiveness and high in safety. Hereinafter, each component is described.

<EVOH (A)>

The EVOH (A) is a main component of the resin composition of the present invention. Here, the EVOH (A) is a copolymer having as a main structural unit an ethylene unit and a vinyl alcohol unit.

The EVOH (A) has, as a lower limit of ethylene unit content (a proportion of the number of ethylene units to the total number of monomer units in the EVOH (A)), an ethylene unit content of preferably 20 mol %, more preferably 22 mol %, and still more preferably 24 mol %. On the other hand, the EVOH (A) has, as an upper limit of ethylene unit content, an ethylene unit content of preferably 60 mol %, more preferably 55 mol %, and still more preferably 50 mol %. The EVOH (A) having an ethylene unit content of no less than the lower limit gives a crosslinked product an excellent oxygen barrier properties in high humidity and gives excellent melt moldability. In addition, the EVOH (A) having an ethylene unit content of no greater than the upper limit gives excellent oxygen barrier properties.

The EVOH (A) has, as a lower limit of degree of saponification (a proportion of the number of vinyl alcohol units to the total number of the vinyl alcohol units and vinyl ester units in the EVOH (A)), a degree of saponification of preferably 80 mol %, more preferably 95 mol %, and still more preferably 99 mol %. On the other hand, the EVOH (A) has, as an upper limit of degree of saponification, a degree of saponification of preferably 100 mol % and more preferably 99.99 mol %. The EVOH (A) having a degree of saponification of no less than the lower limit gives excellent oxygen barrier properties and thermal stability.

When the EVOH (A) is composed of a mixture of two or more types of EVOH that are different in ethylene unit content, an average value calculated from a mixing mass ratio is defined as the ethylene unit content. In this case, the difference between two types of EVOH that have most different ethylene unit contents is preferably no greater than 30 mol %. The difference in ethylene unit content is more preferably no greater than 20 mol % and still more preferably no greater than 15 mol %. Similarly, when the EVOH (A) is composed of a mixture of two or more types of EVOH that are different in degree of saponification, an average value calculated from a mixing mass ratio is defined as the degree of saponification of the mixture. In this case, the difference in degree of saponification is preferably no greater than 7% and more preferably no greater than 5%. When a crosslinked product obtained from the resin composition containing the EVOH (A) is molded into a multilayered structure that is desired, as a multilayered structure, to achieve a balance between thermal moldability and oxygen barrier properties at a high level, the EVOH (A) is preferably used that is obtained by mixing EVOH having an ethylene unit content of no less than 24 mol % and no greater than 34 mol % and a degree of saponification of no less than 99% with EVOH having an ethylene unit content of no less than 34 mol % and no greater than 50 mol % and a degree of saponification of no less than 99% in a blending mass ratio of 60/40 to 90/10.

The ethylene unit content and the degree of saponification of the EVOH (A) can be acquired by nuclear magnetic resonance (NMR) analysis.

The EVOH (A) has, as a lower limit of a melt flow rate (a measured value at a temperature of 210° C. and a load of 2160 g in accordance with JIS K 7210), a melt flow rate of preferably 0.1 g/10 min, more preferably 0.5 g/10 min, still more preferably 1 g/10 min, and particularly preferably 3 g/10 min. On the other hand, the EVOH (A) has, as an upper limit of a melt flow rate, a melt flow rate of preferably 200 g/10 min, more preferably 50 g/10 min, still more preferably 30 g/10 min, particularly preferably 15 g/10 min, and still particularly preferably 10 g/10 min. The EVOH (A) having a melt flow rate value in the above range improves melt kneadability and melt moldability of a resultant resin composition.

The EVOH (A) can also contain, as a copolymer unit, a small amount of another monomer unit other than the ethylene unit and the vinyl alcohol unit within a range not to inhibit the purpose of the present invention. Examples of such a monomer include DO-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri(β-methoxyethoxy)silane, and γ-methacryloxypropyltrimethoxysilane; unsaturated sulfonic acids or salts thereof; unsaturated thiols; and vinylpyrrolidones.

The EVOH (A) containing, as the copolymer component, no less than 0.0002 mol % and no greater than 0.2 mol % of a vinylsilane compound among the other monomers described above can improve consistency in melt viscosity with a polymer (e.g., polyester) to be a base material when a multilayered structure is obtained by coextrusion molding or coinjection molding the resin composition of the present invention containing the EVOH (A) together with the polymer to be a base material, allowing production of a homogeneous molded product. As the vinylsilane compound, for example, vinyltrimethoxysilane or vinyltriethoxysilane is suitably used.

In addition, in order to impart flexibility to the EVOH (A), it is suitable to modify EVOH by a conventionally known method. In this case, an oxygen transmission rate of the EVOH (A) can also be adjusted by adjusting the structure and the amount of the crosslinking agent (B) and a method for producing EVOH.

<Crosslinking Agent (B)>

The crosslinking agent (B) is a powder obtained by impregnating a porous body (BS) with a crosslinkable compound (BL) having three or more polymerizable groups and a melting point of no greater than 40° C. Since having a melting point of no greater than 40° C., the crosslinkable compound (BL) contained in the crosslinking agent (B) sometimes becomes a liquid under temperature conditions where a crosslinked product can be generally used as a packaging material. The crosslinkable compound (BL) impregnated into the porous body (BS), however, is less likely to aggregate or move in the resin composition or a crosslinked product, so that bleeding out of the crosslinkable compound (BL) can be prevented. In addition, since the crosslinkable compound (BL) has three or more polymerizable groups, a crosslinked product can be efficiently produced by irradiation with an activated energy ray such as an electron beam. A crosslinked product obtained as described above is hygienic and excellent in hot water resistance and also excellent in interlayer adhesiveness when formed into a multilayered structure. Here, the impregnation refers to a state in which the crosslinkable compound (BL) is being infiltrating into gaps in a structure of the porous body (BS) that constitutes the crosslinking agent (B). Even if the crosslinkable compound (BL) and the porous body (BS) coexist separately in the EVOH (A) without impregnation, the effects of the present invention cannot be obtained.

Since having a melting point of no greater than 40° C., the crosslinkable compound (BL) is a liquid under temperature conditions where a crosslinked product is generally used as a packaging material. The crosslinkable compound (BL) has a boiling point and a thermal decomposition temperature of preferably no less than 200° C., more preferably no less than 240° C., and still more preferably no less than 260° C. A high boiling point and thermal decomposition temperature suppress loss of the compound during melt kneading and melt molding to easily give a sufficient crosslinking effect.

The polymerizable groups included in the crosslinkable compound (BL) are not particularly limited as long as they can cause a crosslinking reaction with the EVOH (A), and examples of the polymerizable groups include an unsaturated hydrocarbon group, a carboxyl group, an epoxy group, and an isocyanate group. Especially, an unsaturated hydrocarbon group is preferred because it allows easy crosslinking with an activated energy ray.

The unsaturated hydrocarbon group is not limited as long as it is a group having at least one of an ethylenic unsaturated bond and an acetylenic unsaturated bond, and examples of such an unsaturated hydrocarbon group include an alkenyl group, an alkadienyl group, an alkatrienyl group, an arylalkenyl group, an alkynyl group, an alkadiynyl group, and an alkatriynyl group. The number of carbon atoms in the unsaturated hydrocarbon group is generally 2 to 12, preferably 2 to 10, more preferably 2 to 8, and still more preferably 3 to 8.

Examples of the alkenyl group include linear alkenyl groups such as a vinyl group, a propenyl group (allyl group), a butenyl group, a pentenyl group, a hexenyl group, a heptenyl group, an octenyl group, a nonenyl group, and a decenyl group; branched chain alkenyl groups such as a 2-propenyl group, a 1-methylpropenyl group, and a 2-methylpropenyl group; and cyclic alkenyl groups such as a cyclobutenyl group, a cyclopentenyl group, and a cyclohexenyl group.

Examples of the alkadienyl group include linear alkadienyl groups such as a pentadienyl group, a hexadienyl group, a heptadienyl group, and an octadienyl group; and branched chain alkadienyl groups such as a 1-methylpentadienyl group and a 2-methylpentadienyl group.

Examples of the alkatrienyl group include linear alkatrienyl groups such as a hexatrienyl group, a heptatrienyl group, and an octatrienyl group; and branched chain alkatrienyl groups such as a 1-methylhexatrienyl group and a 2-methylhexatrienyl group.

Examples of the arylalkenyl group include a phenylvinyl group and a phenylpropenyl group.

Examples of the alkynyl group include linear alkynyl groups such as a propynyl group, a butynyl group, a pentynyl group, a hexynyl group, a heptynyl group, and an octynyl group; and branched chain alkynyl groups such as a 1-methylpropynyl group and a 2-methylbutynyl group.

Examples of the alkadiynyl group include linear alkadiynyl groups such as a pentadiynyl group, a hexadiynyl group, a heptadiynyl group, and an octadiynyl group; and branched chain alkadiynyl groups such as a 1-methylpentadiynyl group and a 2-methylhexadiynyl group.

Examples of the alkatriynyl group include linear alkatriynyl groups such as a hexatriynyl group, a heptatriynyl group, and an octatriynyl group; and branched chain alkatriynyl groups such as a 1-methylheptatriynyl group and a 2-methyloctatriynyl group.

Among the polymerizable groups described above, a vinyl group, an alkenyl group having 3 to 8 carbon atoms, or an alkadienyl group is preferred, a vinyl group or an alkenyl group having 3 to 6 carbon atoms is more preferred, and a vinyl group or an alkenyl group having 3 to 5 carbon atoms is still more preferred. The polymerizable groups of the crosslinkable compound (BL) are limited to these specific groups to smoothly and sufficiently progress a crosslinking reaction of the crosslinking agent (B) with the EVOH (A). In addition, in order to give a sufficient crosslinking effect, the crosslinkable compound (BL) needs to have three or more polymerizable groups. A crosslinkable compound having two or less polymerizable groups causes a problem of insufficient hot water resistance or necessity for increasing an irradiation dose of an electron beam to give sufficient hot water resistance, sometimes giving adverse effects on appearance and mechanical physical properties as a packaging material.

A part or all the hydrogen atoms of the unsaturated hydrocarbon group may be substituted with a substituent having a hetero atom. The hetero atom in this case should be an atom other than a carbon atom and a hydrogen atom, and examples of the hetero atom include a halogen atom, an oxygen atom, a sulfur atom, and a nitrogen atom. Examples of the halogen atom include a fluorine atom, a chlorine atom, a bromine atom, and an iodine atom. Specific examples of the substituent that has a hetero atom described above include an alkoxy group, a halogen atom, a hydroxy group, an oxygen atom (=O), and a cyano group. The alkoxy group is preferably an alkoxy group having 1 to 5 carbon atoms, preferably a methoxy group, an ethoxy group, an n-propoxy group, an iso-propoxy group, an n-butoxy group, and a tert-butoxy group, and more preferably a methoxy group and an ethoxy group.

The crosslinkable compound (BL) is preferably a triazine derivative. The crosslinkable compound (BL) has a thermally stable triazine structure to considerably improve heat resistance of the crosslinkable compound (BL), so that decomposition of the crosslinkable compound (BL) during melt kneading and melt molding can be prevented, giving a crosslinked product having a sufficient crosslinking level. There are three triazine basic skeletons, i.e., a 1,2,3-triazine, a 1,2,4-triazine, and a 1,3,5-triazine. The triazine basic skeleton, however, is more preferably a 1,3,5-triazine in terms of thermal stability and site symmetry of crosslinking moieties.

The crosslinkable compound (BL) preferably has carbonyl groups as many as or more than the polymerizable groups. The type of the carbonyl groups is not particularly limited, and the carbonyl groups are a partial structure of, for example, an aldehyde, a ketone, a carboxylic acid, an ester, an amide, and an enone. The carbonyl groups have an effect of improving compatibility between the crosslinkable compound (BL) and the EVOH (A) to smoothly and sufficiently progress a crosslinking reaction between the crosslinkable compound (BL) and the EVOH (A), so that bleeding out can be suppressed. The positions of the carbonyl groups in the crosslinkable compound (BL) are not particularly limited. The carbonyl groups, however, are preferably included in the triazine skeleton in terms of improving the thermal stability of the crosslinkable compound (BL) as well as effectively improving the compatibility of the crosslinkable compound (BL) with the EVOH (A), and examples of such a case include a 1,3,5-triazine-2,4,6(1H,3H,5H)-trione structure.

Examples of a specific structure of the crosslinkable compound (BL) include trimethylolpropane trimethacrylate, pentaerythritol triallyl ether, triallyl cyanurate, triallyl isocyanurate, and oligomers thereof. Especially, triallyl isocyanurate and oligomers thereof are preferred in terms of the thermal stability, the compatibility with the EVOH (A), and the like. Triallyl isocyanurate is favorable also in efficiency of a crosslinking reaction by, for example, an activated energy ray. Further, triallyl isocyanurate is easily available and economically excellent. In order to facilitate impregnation into the porous body (BS), a degree of polymerization of the oligomers is preferably no greater than 10.

The porous body (BS) is not particularly limited as long as it has sufficient specific surface area or pore volume and stably supports the crosslinkable compound (BL), and examples of the porous body (BS) include porous inorganic particles, porous organic particles, and composites thereof. Examples of the porous inorganic particles include metal oxide particles (e.g., silica, alumina, zinc oxide, and titanium dioxide), metal hydroxide particles (e.g., aluminum hydroxide, calcium hydroxide, and magnesium hydroxide), metal sulfate particles (e.g., calcium sulfate and barium sulfate), metal nitride particles (e.g., silicon nitride), metal phosphate particles (e.g., calcium phosphate), metal silicate particles (e.g., calcium silicate, aluminum silicate, magnesium silicate, and magnesium aluminosilicate), mineral matter particles (e.g., zeolite, diatom earth, baked diatom earth, talc, kaolin, sericite, bentonite, smectite, and clay), metal carbonate particles (e.g., magnesium carbonate and calcium carbonate), and carbonaceous particles (e.g., activated carbon and carbon). Examples of the porous organic particles include porous thermoplastic resin particles (e.g., porous olefin resin particles, porous styrene resin particles, porous polyamide resin particles, and porous acrylic resin particles) and porous thermosetting resin particles (e.g., a porous silicone resin and a porous polyurethane resin). The porous body of the present invention also includes, for example, aggregated particles having a steric structure where fine primary particles are chemically bonded to each other. These porous bodies can be used singly or in combination of two or more thereof. Especially, porous inorganic particles are preferred in terms of supporting properties, heat resistance, and the like, metal oxide particles of, for example, silica or alumina, mineral matter particles of, for example, diatom earth, and carbonaceous particles of, for example, activated carbon are more preferred, and silica, alumina, and activated carbon are still more preferred. In addition, these porous bodies are high in safety, so that they can be widely used as various packaging materials.

The specific surface area and pore volume of the porous body (BS) may be acquired on the basis of a gas absorption method. A lower limit of the specific surface area is preferably 10 m$^2$/g, more preferably 50 m$^2$/g, and still more preferably 100 m$^2$/g. An upper limit of the specific surface area is preferably 3000 m$^2$/g, more preferably 2500 m$^2$/g, and still more preferably 2000 m$^2$/g. When the specific surface area falls within the above range, the efficiency of the porous body (BS) in supporting the crosslinkable compound (BL) is improved and a resultant resin composition becomes favorable in melt moldability. From the same reasons, the pore volume of the porous body (BS) is preferably no less than 0.50 ml/g, more preferably no less than 1.00 ml/g, and still more preferably no less than 1.50 ml/g.

An average particle diameter of the porous body (BS) can be acquired by averaging particle diameters of 100 particles observed with an electron microscope. A lower limit of the average particle diameter is preferably 0.01 µm, more preferably 0.05 µm, and still more preferably 0.1 µm. An upper limit of the average particle diameter is preferably 100 µm, more preferably 50 µm, and still more preferably 10 µm. When the average particle diameter falls within the above range, handleability of the crosslinking agent (B) as a powder is improved and a resultant crosslinked product becomes favorable in appearance.

A mass ratio (BL)/(BS) between the crosslinkable compound (BL) and the porous body (BS) in the crosslinking agent (B) is preferably 20/80 to 80/20 and more preferably 30/70 to 70/30. The crosslinking agent (B) having a ratio of the crosslinkable compound (BL) in this range can effectively suppress bleeding out of the crosslinkable compound (BL) and achieve a sufficient crosslinking effect. This ratio can be adjusted by controlling the amount of the crosslinkable compound (BL) impregnated into the porous body (BS). An impregnation method is not also particularly limited, and examples thereof include a method for dropping little by little or spraying the crosslinkable compound (BL) to the porous body (BS) to mix them together while the porous body (BS) is stirred or vibrated.

The usage of the crosslinking agent (B) in the resin composition of the present invention may be determined according to a degree of crosslinking required in a crosslinked product. A lower limit of the usage, however, is necessarily 0.6 parts by mass, preferably 0.8 parts by mass, and more preferably 1 part by mass, relative to 100 parts by mass of the EVOH (A). An upper limit of the usage is necessarily 15 parts by mass, preferably 12 parts by mass, and more preferably 9 parts by mass, relative to 100 parts by mass of the EVOH (A). When the usage of the crosslinking agent (B) falls within the above range, the crosslinking of the EVOH (A) can be sufficiently progressed to give a crosslinked product excellent in hot water resistance and interlayer adhesiveness. The usage of the crosslinking agent (B) more than the above range sometimes deteriorates the interlayer adhesiveness and causes appearance defects such as gel and granules.

In the resin composition of the present invention, the difference in SP value between the EVOH (A) and the crosslinkable compound (BL) may be no less than 0.7. A difference in SP value of no less than 0.7 sometimes causes a problem of bleeding out of the crosslinkable compound (BL). In the resin composition of the present invention, however, the crosslinkable compound (BL) is impregnated into the porous body (BS), so that the crosslinkable compound (BL) is less likely to aggregate or move in the resin composition to prevent the bleeding out of the crosslinkable compound (BL). The "SP value" can be acquired according to a formula of Fedors (Polym. Eng. Sci., 14[2], 147 (1974)).

<Hindered Phenol Compound (C)>

The resin composition of the present invention may contain a hindered phenol compound (C) as necessary. The hindered phenol compound (C) has an ester bond or an amide bond. Here, the hindered phenol compound (C) refers to an organic compound having at least one phenol group whose aromatic moiety is substituted at at least one position, preferably both positions directly adjacent to a carbon atom having a phenolic hydroxyl group as a substituent. A substituent adjacent to the hydroxyl group is an alkyl radical appropriately selected from alkyl groups having 1 to 10 carbon atoms and is preferably a tertiary butyl group.

The hindered phenol compound (C) is preferably a solid at 40° C. For the purpose of suppressing the bleeding out, the hindered phenol compound (C) has a melting point or a softening temperature of preferably no less than 50° C., more preferably no less than 60° C., and still more preferably no less than 70° C. From the same reasons, the molecular weight of the hindered phenol compound (C) is preferably no less than 200, more preferably no less than 400, and still more preferably no less than 600. In addition, for the purpose of facilitating mixing with the EVOH (A), the hindered phenol compound (C) has a melting point or a softening temperature of no greater than 200° C., more preferably no greater than 190° C., and still more preferably 180° C.

The hindered phenol compound (C) preferably has an amide bond. The hindered phenol compound (C) having an amide bond gives particularly excellent effects of stabilizing viscosity of the EVOH (A) and preventing generation of gel.

Examples of a specific structure of the hindered phenol compound (C) include:
pentaerythritol tetrakis[3-(3,5-di-tert-butyl-4-hydroxyphenyl)propionate] commercially available from BASF SE as IRGANOX 1010;
stearyl 3-(3,5-di-tert-butyl-4-hydroxyphenyl)propionate commercially available as IRGANOX 1076;
2,2'-thiodiethylbis[3-(3,5-di-tert-butyl-4-hydroxyphenyl)propionate] commercially available as IRGANOX 1035;
octadecyl 3-(3,5-di-tert-butyl-4-hydroxyphenyl)propanoate commercially available as IRGANOX 1135;
ethylenebis(oxyethylene)bis(3-tert-butyl-4-hydroxy-5-methylbenzenepropanoate) commercially available as IRGANOX 245;
1,6-hexanediol bis[3-(3,5-di-tert-butyl-4-hydroxyphenyl)propionate] commercially available as IRGANOX 259; and
N,N'-hexamethylene bis[3-(3,5-di-tert-butyl-4-hydroxyphenyl)propanamide]commercially available as IRGANOX 1098.

Especially, the hindered phenol compound (C) is more preferably N,N'-hexamethylene bis[3-(3,5-di-tert-butyl-4-hydroxyphenyl)propanamide] commercially available as IRGANOX 1098, which has an amide bond.

The usage of the hindered phenol compound (C) in the resin composition of the present invention may be determined according to the conditions during melt kneading and melt molding, and a lower limit of the usage is preferably 0.2 parts by mass and more preferably 0.4 parts by mass, relative to 100 parts by mass of the EVOH (A). An upper limit of the usage is preferably 5 parts by mass and more preferably 3 parts by mass, relative to 100 parts by mass of the EVOH (A). When the usage of the hindered phenol compound (C) falls within the above range, decomposition and crosslinking during melt kneading and melt molding can be prevented, so that the viscosity can be stably maintained for a long period of time. Further, generation of gel during melt kneading and melt molding can be prevented to produce a crosslinked product excellent in appearance.

<Other Components>

The resin composition of the present invention may contain another component within a range not to impair the effects of the present invention. Examples of the other component include a boron compound, an alkali metal salt, a phosphoric acid compound, an oxidizable substance, another polymer, an oxidization accelerator, and another additive.

<Boron Compound>

Addition of a boron compound to the resin composition of the present invention is advantageous in terms of improving melt viscosity of the EVOH and obtaining a homogenous coextrusion molded product or a coinjection molded product. Examples of the boron compound include boric acids, a boric acid ester, a boric acid salt, and boron hydrides. Specific examples of the boric acids include orthoboric acid (hereinafter, also merely referred to as "boric acid"), metaboric acid, and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is preferably 20 to 2000 ppm and more preferably 50 to 1500 ppm in terms of the boron element equivalent. The content of the boron compound in this range can give EVOH that is produced while torque variation is suppressed during heat melting. With a content of less than 20 ppm, such an effect is small, whereas with a content exceeding 2000 ppm, gelation is likely to occur, sometimes leading inferior moldability.

<Alkali Metal Salt>

The resin composition of the present invention contains an alkali metal salt in an amount of preferably 5 to 5000 ppm, more preferably 20 to 1000 ppm, and still more preferably 30 to 500 ppm in terms of the alkali metal element equivalent. The resin composition containing an alkali metal salt in the above range can improve the interlayer adhesiveness and the compatibility. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, lithium phosphate, sodium stearate, potassium stearate, and sodium salts of ethylene diamine tetraacetic acid. Especially, sodium acetate, potassium acetate, and sodium phosphate are preferred.

<Phosphoric Acid Compound>

The resin composition of the present invention preferably contains a phosphoric acid compound in an amount of preferably 1 to 500 ppm, more preferably 5 to 300 ppm, and still more preferably 10 to 200 ppm in terms of the phosphate radical equivalent. Blending the phosphoric acid compound in the above range can improve the thermal stability of the EVOH and suppress, in particular, generation of gel-state granules and coloring during melt molding for a long period of time.

The type of the phosphoric acid compound added to the resin composition of the present invention is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

The resin composition of the present invention may contain various types of additives within a range not to impair the effects of the present invention. Examples of such additives include an antioxidant, a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent.

<Method for Producing Resin Composition>

A method for producing a resin composition of the present invention includes a copolymerization step of copolymerizing ethylene with a vinyl ester to give an ethylene-vinyl ester copolymer, a saponification step of saponifying the ethylene-vinyl ester copolymer to give an ethylene-vinyl alcohol copolymer (A), and a mixing step of mixing the ethylene-vinyl alcohol copolymer (A) with a crosslinking agent (B) that is a powder obtained by impregnating a porous body (BS) with a crosslinkable compound (BL) having three or more polymerizable groups and a melting point of no greater than 40° C. to give a mixture.

The copolymerization step includes, in addition to a step of copolymerizing ethylene with a vinyl ester, a step of adding a polymerization inhibitor as necessary, and subsequently removing unreacted ethylene and vinyl ester to give an ethylene-vinyl ester copolymer solution. As a method for copolymerizing ethylene with a vinyl ester, there can be exemplified known methods such as solution polymerization, suspension polymerization, emulsion polymerization, and bulk polymerization.

As a representative vinyl ester used for polymerization, there can be exemplified vinyl acetate, however, there can also be used other aliphatic vinyl esters such as vinyl propionate and vinyl pivalate. In addition, a small amount of a copolymerizable monomer can be copolymerized.

A polymerization temperature is preferably 20 to 90° C. and more preferably 40 to 70° C. A polymerization period is preferably 2 to 15 hours and more preferably 3 to 11 hours. The rate of polymerization is preferably 10 to 90% and more preferably 30 to 80%, relative to the amount of a vinyl ester blended. A resin content in the solution after polymerization is preferably 5 to 85% by mass and more preferably 20 to 70% by mass.

In the saponification step, an alkali catalyst is added to the ethylene-vinyl ester copolymer solution to saponify the copolymer in the solution. Both continuous and batch saponification methods can be carried out. Examples of the alkali catalyst include sodium hydroxide, potassium hydroxide, and an alkali metal alcoholate.

In the mixing step, it is preferred to add, to the EVOH (A), the crosslinking agent (B) and the hindered phenol compound (C) as necessary and then melt knead the mixture. The mixing can be carried out by using known mixing apparatuses or kneading apparatuses such as Kneader-Rudder, an extruder, a mixing roll, and the Banbury mixer. A temperature during melt kneading is generally 110 to 300° C. The hindered phenol compound (C) may be contained in the EVOH (A) or the crosslinking agent (B) in advance.

<Method for Producing Crosslinked Product>

In the resin composition of the present invention, the EVOH (A) is crosslinked by the crosslinking agent (B) through externally imparted energy. The crosslinking is preferably carried out by irradiation with at least one activated energy ray selected from the group consisting of an electron beam, an X-ray, a γ-ray, an ultraviolet ray, and a visible light ray, or by heating. Especially, in a case of irradiation with an activated energy ray, only irradiation with an activated energy ray enables crosslinking, not requiring, for example, a special extruder, so that a crosslinked product can be produced simply and at low cost. Among the activated energy rays, crosslinking is preferably carried out by the electron beam in terms of crosslinking speed and efficiency of crosslinking. Thus, a crosslinked product can be efficiently produced that is accompanied by suppressed bleeding out and favorable hot water resistance and interlayer adhesiveness.

When the electron beam, the X-ray, or the γ-ray is used, the absorbed dose is preferably no less than 1 kGy, more preferably 1 kGy to 1 MGy, still more preferably 5 kGy to 500 kGy, and particularly preferably 10 kGy to 200 kGy. An absorbed dose of less than 1 KGy does not improve the degree of crosslinking, so that intended performance such as hot water resistance cannot sometimes be obtained. Whereas an absorbed dose of greater than 1 MGy may possibly cause decomposition of, for example, the EVOH, sometimes leading to problems such as a decrease in mechanical strength and coloring when the crosslinked product is formed into a film.

When irradiation with light is used, an irradiation period is affected by the thickness of a crosslinked product, the type of a light source, and other conditions, and the irradiation may be carried out for a period of at most several minutes, generally within 1 minute, and 1 second or shorter as the case may be, with use of, for example, a high-pressure mercury vapor lamp, a low-pressure mercury vapor lamp, a carbon arc lamp, a xenon lamp, a metal halide lamp, or an LED.

It is to be noted that the step of crosslinking the resin composition of the present invention may be determined to meet the features of a molded product intended, and the step may be carried out either before or after molding. Particularly, taking into consideration the degree of freedom in molding the resin composition, the crosslinking is preferably carried out after molding.

<Method for Molding Crosslinked Product>

In molding the resin composition of the present invention, a molding method is appropriately selected to mold various molded products such as a film, a sheet, a container, and other packaging materials. In this procedure, the resin composition may be once formed into pellets and then subjected to molding, or the components of the resin composition may be dry blended and then directly subjected to molding.

With regard to the molding method and the molded product, for example, melt extrusion molding can provide a film, a sheet, a pipe, and the like, injection molding can provide a form of a container, and hollow molding can provide a bottle, etc. -shaped hollow container. Examples of the hollow molding include extrusion hollow molding of forming a parison by extrusion molding and blowing the parison for molding, and injection hollow molding of molding a preform by injection molding and blowing the preform for molding. Especially, it is preferred to employ, for retort packaging materials, a method for molding a packaging material in a form of, for example, a multilayer film by melt extrusion molding, and a method for thermoforming a multilayer sheet molded by melt extrusion molding, into a container-shaped packaging material. In addition, it is also preferred to employ, depending on the use, a method for forming a parison by extrusion molding and blow molding the parison to provide a comparatively soft multilayer container-shaped packaging material.

The crosslinked product of the present invention obtained as described above covers a broad range of uses. Preferable examples of the uses include an extrusion molded article, a film or a sheet (particularly, a stretched film or a thermally shrunk film), a thermoformed article, wallpaper or a decorative laminate board, a pipe or a hose, a profile molded article, an extrusion blow molded article, an injection molded article, a flexible packaging material, and a container (particularly, a retort packaging container). As a molded article having a multilayered structure, preferred are, for example, a coextruded film or a coextruded sheet, a thermally shrunk film, a multilayer pipe (particularly, a fuel pipe or a pipe for circulating hot water), a multilayer hose (particularly, a fuel hose), and a multilayer container (particularly, a coextrusion blow molded container, a coinjection molded container, and a retort container).

The multilayered structure is obtained by laminating a layer of a crosslinked product obtained by the molding as described above with another layer.

With a layer formed of a polymer other than the resin composition of the present invention, a resin composition layer of the present invention, and an adhesive polymer layer defined as a "x layer," a "y layer," and a "z layer," respectively, there can be exemplified x/y, x/y/x, x/z/y, x/z/y/z/x, x/y/x/y/x, and x/z/y/z/x/z/y/z/x, as layer constructions of the multilayered structure. When a plurality of x layers are provided, the types of the x layers may be the same or different. Also, a layer containing a recycled polymer formed of a scrap such as a trim generated during molding may be additionally provided, or alternatively a recycled polymer may be blended in a layer formed of another polymer. Although the construction of each layer in the multilayered structure in terms of the thickness is not particularly limited, the proportion of the thickness of the y layer to the total layer thickness is preferably 2 to 20% in light of moldability, cost and the like.

The polymer used in the x layer is preferably a thermoplastic polymer in light of processability and the like. Examples of such a thermoplastic polymer include the following polymers:

polyethylene, polypropylene, an ethylene-propylene copolymer, an ethylene, or propylene copolymer (a copolymer of ethylene or propylene with at least one of the following monomers:

α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, salts thereof, partial or complete esters thereof, nitriles thereof, amides thereof, and anhydrides thereof;

carboxylic acid vinyl esters such as vinyl formate, vinyl acetate, vinyl propionate, vinyl butyrate, vinyl octanoate, vinyl dodecanoate, vinyl stearate, and vinyl arachidonate; vinylsilane compounds such as vinyltrimethoxysilane;

an unsaturated sulfonic acid or salts thereof; alkylthiols; vinylpyrrolidones; and the like), polyolefins such as poly 4-methyl-1-pentene and poly 1-butene; and polyesters such as polyethylene terephthalate, polybutylene terephthalate, and polyethylene naphthalate;

polyamides such as poly ε-caprolactam, polyhexamethyleneadipamide, and polymetaxylyleneadipamide; and polyvinylidene chloride, polyvinyl chloride, polystyrene, polyacrylonitrile, polycarbonate, and a polyacrylate.

Such a thermoplastic polymer layer may be unstretched, or monoaxially or biaxially stretched or rolled. For use of retort containers, a polyamide, a polyester, or polypropylene among these polymers is preferably used on an outer layer side of a package in which food or the like is packed. Whereas, polypropylene is preferably used on an inner layer side.

Among these thermoplastic polymers, a polyolefin is preferred in terms of moisture resistance, mechanical characteristics, economic efficiency, heat sealing properties, and the like, whereas a polyamide and a polyester are preferred in terms of mechanical characteristics, heat resistance, and the like.

On the other hand, any adhesive polymer used for the z layer serves as long as it enables adhesion between the layers, and preferred are, for example, a polyurethane type or polyester type one-component or two-component curable adhesive and a carboxylic acid-modified polyolefin polymer. The carboxylic acid-modified polyolefin polymer is an olefin-derived polymer or copolymer that includes an unsaturated carboxylic acid or an anhydride thereof (e.g., maleic anhydride) as a copolymerization component; or a graft copolymer obtained by subjecting an unsaturated carboxylic acid or an anhydride thereof to grafting with an olefin-derived polymer or copolymer.

For production of the multilayered structure by, for example, a coinjection molding method or a coextrusion molding method, a carboxylic acid-modified polyolefin polymer is more preferred. Particularly, when the x layer is a polyolefin polymer, favorable adhesiveness with the y layer is attained. Examples of a polyolefin polymer that constitutes such a carboxylic acid-modified polyolefin polymer include polyethylene such as low density polyethylene (LDPE), linear low density polyethylene (LLDPE), and very low density polyethylene (VLDPE); polypropylene; copolymerized polypropylene; an ethylene-vinyl acetate copolymer; and an ethylene-(meth)acrylic acid ester (methyl ester or ethyl ester) copolymer. On the other hand, for production of the multilayered structure by a dry lamination method, a polyurethane type two-component curable adhesive is more preferred. In this case, because various polymers can be used for the x layer, a function of the multilayered structure can be more enhanced.

As a method for obtaining the multilayered structure of the present invention, there can be exemplified an extrusion lamination method, a dry lamination method, a coinjection molding method, and a coextrusion molding method. Examples of the coextrusion molding method include a coextrusion lamination method, a coextrusion sheet molding method, a coextrusion inflation molding method, and a coextrusion blow molding method.

A sheet, a film, a parison, or the like having the multilayered structure of the present invention obtained as described above can be reheated at a temperature of no greater than the melting point of a polymer contained, and monoaxially or biaxially stretched by, for example, a thermoforming method such as draw molding, a roll stretching method, a pantograph system stretching method, an inflation stretching method, or a blow molding method, to give a stretched molded product.

The multilayered structure of the present invention is applicable to various uses, and for example, it can be used for the uses exemplified for the crosslinked product described above. Especially, the multilayered structure is preferably used for retort containers in an attempt to take advantages of the multilayered structure, such as suppressed bleeding out of the crosslinking agent, and favorable hot water resistance and interlayer adhesiveness. In addition, the multilayered structure is suitably applicable also as a container for, for example, chemically active chemical goods or an agrichemical. Hereinafter, an aspect is described in which the multilayered structure of the present invention is utilized as a retort container.

With use of the multilayered structure of the present invention, a flexible retort container can be provided that is formed of a thin multilayered structure having a total thickness of all layers (hereinafter, also merely referred to as "total layer thickness") of no greater than 300 μm. Generally, such a flexible retort container is processed into a form of a pouch or the like. Since this container is excellent in oxygen barrier properties, hot water resistance, and interlayer adhesiveness and can be simply produced, it is useful for packaging a product that is highly sensitive to oxygen and is likely to deteriorate.

An upper limit of the total layer thickness of such a multilayer film is preferably 300 μm, more preferably 250 μm, and still more preferably 200 μm in light of maintaining flexibility. On the other hand, a lower limit of the total layer thickness is preferably 10 μm, more preferably 20 μm, and still more preferably 30 μm, taking into consideration mechanical characteristics of the multilayer film as a container.

The retort container formed of a multilayer film having a total layer thickness of no greater than 300 μm can be produced from a multilayer film obtained by, for example, laminating a layer formed of the resin composition of the present invention and a thermoplastic resin layer according to a method such as dry lamination or coextrusion lamination.

When the retort container is produced from a multilayer film obtained by dry lamination, there can be used, as the multilayer film, an unstretched film, a monoaxially stretched film, a biaxially stretched film, and a rolled film, for example. Especially, a biaxially stretched polypropylene film, a biaxially stretched polyester film, and a biaxially stretched polyamide film are preferred in light of mechanical strength and heat resistance. When an unstretched film or a monoaxially stretched film is used, a laminated multilayer film can be reheated and monoaxially or biaxially stretched by, for example, a thermoforming method such as draw molding, a roll stretching method, a pantograph system stretching method, or an inflation stretching method to give a stretched multilayer film.

For sealing a resultant retort container, it is preferred to provide a layer formed of a heat sealable resin on the surface of at least one outermost layer in a step of producing the multilayer film. Examples of such a resin include polyolefins such as polyethylene and polypropylene.

The retort container obtained as described above is excellent in safety, flexible, and simple, and is also excellent in oxygen barrier properties, so that the retort container is useful for packaging a content that is likely to deteriorate in the presence of oxygen, particularly food as well as pet food, medical drug, and the like.

EXAMPLES

Hereinafter, an embodiment of the present invention is more specifically described by way of examples. The present invention, however, is not in any way limited by these examples. Here, quantitative terms are on mass basis unless otherwise stated in particular. Each measurement and evaluation in the examples and comparative examples was performed according to the following particulars.

(1) Gel Fraction

Pellets of a resin composition obtained in the following examples and comparative examples were subjected to melt extrusion in a 20 mmϕ single screw extruder (210° C.) with a coat hanger die to give a monolayer film having a thickness of 20 μm. The resultant monolayer film was introduced into an electron beam irradiator, and crosslinking was carried out by irradiation with an electron beam at an accelerating voltage of 250 kV to give an irradiated monolayer film. Next, the resultant irradiated monolayer film was cut into a 20 cm square. In 100 parts by mass of a mixed solvent of water (15% by mass) and phenol (85% by mass) was immersed 1 part by mass of the irradiated monolayer film, and the solvent was heated at 60° C. for 12 hours to permit dissolution of the film, followed by filtration. The filtrate was evaporated to dryness, and the solid matter residue (%) was calculated, which was defined as a gel fraction.

(2) Hot Water Resistance (Evaluation of Monolayer Film)

An irradiated monolayer film obtained in the same manner as in (1) was subjected to a retort treatment at 135° C. for 60 minutes, and the appearance of the film was observed by visual inspection. In the inspection, the appearance of the film was evaluated according to the following criteria:

A: no dissolution of film entirely;
B: partial dissolution of film; and
C: entire dissolution of film with original shape of film lost.

(3) Hot Water Resistance (Evaluation of Multilayer Film)

A stretched polyamide film (ON) and an unstretched polypropylene film (CPP) were laminated on both sides of a monolayer film (before irradiation with an electron beam) obtained in the same manner as in (1) with a polyurethane type two-component curable adhesive (Ad) interposed between the stretched and unstretched films and the monolayer film to give a multilayer film ((outer layer) ON 15 μm/Ad/EVOH layer (monolayer film) 20 m/Ad/CPP 50 μm (inner layer)). The resultant multilayer film was introduced into an electron beam irradiator, and crosslinking was carried out by irradiation with an electron beam at an accelerating voltage of 250 kV to give an irradiated multilayer film. A pouch was manufactured using the resultant irradiated multilayer film, water was poured into the pouch, and the pouch was subjected to a retort treatment at 135° C. for 60 minutes. Then, the appearance of the pouch was observed by visual inspection. In the inspection, the appearance of the pouch was evaluated according to the following criteria:

A: no delamination of inner and outer layers from EVOH layer, with transparency of EVOH layer maintained;
B: partial delamination of inner and outer layers from EVOH layer, or slight whitening of EVOH layer; and
C: delamination in large part of inner and outer layers from EVOH layer, or remarkable whitening of EVOH layer.

(4) OTR (Oxygen Transmission Rate; Before Retorting)

With use of an irradiated multilayer film obtained in the same manner as in (3), OTR was measured under the following conditions.

Conditions: 20° C., (external) 65% RH/(internal) 100% RH (5) OTR (Oxygen Transmission Rate; after Retorting)

A pouch was manufactured using an irradiated multilayer film obtained in the same manner as in (3), water was poured into the pouch, and the pouch was subjected to a retort treatment at 135° C. for 60 minutes. Then, OTR of the retort-treated pouch was measured under the following conditions.

Conditions: 20° C., (external) 65% RH/(internal) 100% RH, 1 day after retorting (6) Interlayer Adhesiveness An irradiated monolayer film obtained in the same manner as in (1) was stored for three months under the conditions of 40° C. and 90% RH and then laminated with a CPP film (50 μm) using a polyurethane type two-component curable adhesive. The laminate was subjected to an aging treatment at 40° C. for 2 days, and then the adhesiveness of the laminate was evaluated:

A: favorable adhesiveness without delamination even upon application of force;
B: favorably adhered with occasional delamination upon application of force; and
C: not delaminated in general use but delaminated upon application of force.

(7) Appearance Characteristics (Generation of Gel and Granules)

Generation of gel and granules of an irradiated monolayer film obtained in the same manner as in (1) were confirmed by visual inspection and evaluated according to the following criteria A to E, and the evaluation was used as an index of the appearance characteristics (generation of gel and granules). The criterion C is a borderline level of whether or not the film is for actual use.

A: almost no gel and granules
B: a small number of gel and granules
C: some gel and granules
D: quite a lot of gel and granules
E: a large number of gel and granules In the following Examples 1 to 28 and Comparative Examples 1 to 12, EVOH was used that had the following physical properties:

(EVOH-1) ethylene content: 27 mol %, degree of saponification: 99.8%, SP value: 14.43;
(EVOH-2) ethylene content: 24 mol %, degree of saponification: 99.8%, SP value: 13.64; or
(EVOH-3) ethylene content: 44 mol %, degree of saponification: 99.8%, SP value: 13.03.

In the following Examples 1 to 28 and Comparative Examples 1 to 12, a crosslinking agent was used that had the composition and physical properties shown in Table 1. The crosslinking agent was obtained as a powder by stirring a necessary amount of a porous body (BL) while a necessary amount of a crosslinkable compound (BS) was added by dropping, and further continuously stirring the mixture for 30 minutes after completion of the dropping to impregnate the crosslinkable compound (BL) into the porous body (BS). In the crosslinking agent 22, however, the impregnation treatment was not carried out.

TABLE 1

|  | Crosslinkable compound (BL) | Porous particles (BS) | Mass ratio (BL)/(BS) |
|---|---|---|---|
| Crosslinking agent 1 | Trimethylolpropane trimethacrylate (TMPTMA, melting point: about −29° C., SP value: 9.74) | Silica 1 (specific surface area: about 400 m$^2$/g, average particle diameter: about 5 μm) | 50/50 |
| Crosslinking agent 2 | Pentaerythritol triallyl ether (PETAE, melting point: about −20° C., SP value: 10.05) | Silica 1 (specific surface area: about 400 m$^2$/g, average particle diameter: about 5 μm) | 50/50 |
| Crosslinking agent 3 | Triallyl cyanurate (TAC, melting point: 27° C., SP value: 10.92) | Silica 1 (specific surface area: about 400 m$^2$/g, average particle diameter: about 5 μm) | 50/50 |
| Crosslinking agent 4 | Triallyl isocyanurate (TAIC, melting point: 25° C., SP value: 13.64) | Silica 1 (specific surface area: about 400 m$^2$/g, average particle diameter: about 5 μm) | 15/85 |
| Crosslinking agent 5 | Triallyl isocyanurate (TAIC, melting point: 25° C., SP value: 13.64) | Silica 1 (specific surface area: about 400 m$^2$/g, average particle diameter: about 5 μm) | 25/75 |
| Crosslinking agent 6 | Triallyl isocyanurate (TAIC, melting point: 25° C., SP value: 13.64) | Silica 1 (specific surface area: about 400 m$^2$/g, average particle diameter: about 5 μm) | 40/60 |

TABLE 1-continued

| | Crosslinkable compound (BL) | Porous particles (BS) | Mass ratio (BL)/(BS) |
|---|---|---|---|
| Crosslinking agent 7 | Triallyl isocyanurate (TAIC, melting point: 25° C., SP value: 13.64) | Silica 1 (specific surface area: about 400 m$^2$/g, average particle diameter: about 5 μm) | 50/50 |
| Crosslinking agent 8 | Triallyl isocyanurate (TAIC, melting point: 25° C., SP value: 13.64) | Silica 1 (specific surface area: about 400 m$^2$/g, average particle diameter: about 5 μm) | 60/40 |
| Crosslinking agent 9 | Triallyl isocyanurate (TAIC, melting point: 25° C., SP value: 13.64) | Silica 1 (specific surface area: about 400 m$^2$/g, average particle diameter: about 5 μm) | 75/25 |
| Crosslinking agent 10 | Triallyl isocyanurate (TAIC, melting point: 25° C., SP value: 13.64) | Silica 1 (specific surface area: about 400 m$^2$/g, average particle diameter: about 5 μm) | 85/15 |
| Crosslinking agent 11 | Triallyl isocyanurate (TAIC, melting point: 25° C., SP value: 13.64) | Silica 2 (specific surface area: about 60 m$^2$/g, average particle diameter: about 5 μm) | 60/40 |
| Crosslinking agent 12 | Triallyl isocyanurate (TAIC, melting point: 25° C., SP value: 13.64) | Alumina (specific surface area: about 200 m$^2$/g, average particle diameter: about 5 μm) | 60/40 |
| Crosslinking agent 13 | Triallyl isocyanurate (TAIC, melting point: 25° C., SP value: 13.64) | Diatom earth (specific surface area: about 30 m$^2$/g, average particle diameter: about 15 μm) | 60/40 |
| Crosslinking agent 14 | Triallyl isocyanurate (TAIC, melting point: 25° C., SP value: 13.64) | Activated carbon (specific surface area: about 900 m$^2$/g, average particle diameter: about 10 μm) | 60/40 |
| Crosslinking agent 15 | None | Silica 1 (specific surface area: about 400 m$^2$/g, average particle diameter: about 5 μm) | 0/100 |
| Crosslinking agent 16 | None | Diatom earth (specific surface area: about 30 m$^2$/g, average particle diameter: about 15 μm) | 0/100 |
| Crosslinking agent 17 | Triallyl cyanurate (TAC, melting point: 27° C., SP value: 9.74) | None | 100/0 |
| Crosslinking agent 18 | Triallyl isocyanurate (TAIC, melting point: 25° C., SP value: 13.64) | None | 100/0 |
| Crosslinking agent 19 | Glycerin monoallyl ether (GMAE, melting point: −100° C., SP value: 13.77) | Silica 1 (specific surface area: about 400 m$^2$/g, average particle diameter: about 5 μm) | 50/50 |
| Crosslinking agent 20 | Diallyl Maleate (DAM, melting point: −47° C., SP value: 9.78) | Silica 1 (specific surface area: about 400 m$^2$/g, average particle diameter: about 5 μm) | 50/50 |
| Crosslinking agent 21 | Trimethylolpropane diallyl ether (TMPDAE, melting point: −20° C., SP value: 10.03) | Silica 1 (specific surface area: about 400 m$^2$/g, average particle diameter: about 5 μm) | 50/50 |
| Crosslinking agent 22 | Triallyl isocyanurate (TAIC, melting point: 25° C., SP value: 13.64)*[1] | Silica 1 (specific surface area: about 400 m$^2$/g, average particle diameter: about 5 μm)*[1] | 60/40 |

*[1]TAIC not impregnated into silica

In the following Examples 1 to 28 and Comparative Examples 1 to 12, a hindered phenol compound was used that had the following structure:
(hindered phenol compound 1) IRGANOX 1010 manufactured by BASF SE, pentaerythritol tetrakis[3-(3,5-di-tert-butyl-4-hydroxyphenyl)propionate]; or
(hindered phenol compound 2) IRGANOX 1098 manufactured by BASF SE, N,N'-hexamethylene bis[3-(3,5-di-tert-butyl-4-hydroxyphenyl)propanamide].

Examples 1 to 28 and Comparative Examples 1 to 12

Using a 25 mmφ twin screw extruder, the aforementioned EVOH, crosslinking agent, and hindered phenol compound were melt kneaded at 210° C. at the proportion shown in Table 2 to prepare pellets of a crosslinkable resin composition. The irradiation dose of an electron beam in each measurement and evaluation was 10 kGy in Example 26, no irradiation in Comparative Example 1, and 100 kGy in the other examples and comparative examples. In Comparative Example 12, the crosslinkable compound (BL) was not impregnated into the porous particles (BS), but the crosslinkable compound (BL) and the porous particles (BS) were separately charged into the EVOH and melt kneaded. The evaluation results are shown in Table 3.

TABLE 2

| | EVOH (A) | | Crosslinking agent (B) | | | | Hindered phenol compound (C) | |
|---|---|---|---|---|---|---|---|---|
| | Type | Ethylene unit content | Type | Crosslinkable compound (BL) | Porous particles (BS) | Mass ratio (BL)/(BS) | Amount added *1 | Type | Amount added *1 |
| Example 1 | EVOH-1 | 27 | Crosslinking agent 1 | TMPTMA | Silica 1 | 50/50 | 6 | — | — |
| Example 2 | EVOH-1 | 27 | Crosslinking agent 2 | PETAE | Silica 1 | 50/50 | 6 | — | — |
| Example 3 | EVOH-1 | 27 | Crosslinking agent 3 | TAC | Silica 1 | 50/50 | 6 | — | — |
| Example 4 | EVOH-1 | 27 | Crosslinking agent 4 | TAIC | Silica 1 | 15/85 | 6 | — | — |
| Example 5 | EVOH-1 | 27 | Crosslinking agent 5 | TAIC | Silica 1 | 25/75 | 6 | — | — |
| Example 6 | EVOH-1 | 27 | Crosslinking agent 6 | TAIC | Silica 1 | 40/60 | 6 | — | — |
| Example 7 | EVOH-1 | 27 | Crosslinking agent 7 | TAIC | Silica 1 | 50/50 | 6 | — | — |
| Example 8 | EVOH-1 | 27 | Crosslinking agent 8 | TAIC | Silica 1 | 60/40 | 6 | — | — |
| Example 9 | EVOH-1 | 27 | Crosslinking agent 9 | TAIC | Silica 1 | 75/25 | 6 | — | — |
| Example 10 | EVOH-1 | 27 | Crosslinking agent 10 | TAIC | Silica 1 | 85/15 | 6 | — | — |
| Example 11 | EVOH-1 | 27 | Crosslinking agent 8 | TAIC | Silica 1 | 60/40 | 6 | Compound 1 | 1 |
| Example 12 | EVOH-1 | 27 | Crosslinking agent 8 | TAIC | Silica 1 | 60/40 | 6 | Compound 2 | 0.1 |

TABLE 2-continued

| | EVOH (A) | | Crosslinking agent (B) | | | | | Hindered phenol compound (C) | |
|---|---|---|---|---|---|---|---|---|---|
| | Type | Ethylene unit content | Type | Crosslinkable compound (BL) | Porous particles (BS) | Mass ratio (BL)/(BS) | Amount added *1 | Type | Amount added *1 |
| Example 13 | EVOH-1 | 27 | Crosslinking agent 8 | TAIC | Silica 1 | 60/40 | 6 | Compound 2 | 0.3 |
| Example 14 | EVOH-1 | 27 | Crosslinking agent 8 | TAIC | Silica 1 | 60/40 | 6 | Compound 2 | 1 |
| Example 15 | EVOH-1 | 27 | Crosslinking agent 8 | TAIC | Silica 1 | 60/40 | 6 | Compound 2 | 4 |
| Example 16 | EVOH-1 | 27 | Crosslinking agent 8 | TAIC | Silica 1 | 60/40 | 6 | Compound 2 | 6 |
| Example 17 | EVOH-1 | 27 | Crosslinking agent 11 | TAIC | Silica 2 | 60/40 | 6 | — | — |
| Example 18 | EVOH-1 | 27 | Crosslinking agent 12 | TAIC | Alumina | 60/40 | 6 | — | — |
| Example 19 | EVOH-1 | 27 | Crosslinking agent 13 | TAIC | Diatom earth | 60/40 | 6 | — | — |
| Example 20 | EVOH-1 | 27 | Crosslinking agent 14 | TAIC | Activated carbon | 60/40 | 6 | — | — |
| Example 21 | EVOH-1 | 27 | Crosslinking agent 8 | TAIC | Silica 1 | 60/40 | 0.8 | — | — |
| Example 22 | EVOH-1 | 27 | Crosslinking agent 8 | TAIC | Silica 1 | 60/40 | 2 | — | — |
| Example 23 | EVOH-1 | 27 | Crosslinking agent 8 | TAIC | Silica 1 | 60/40 | 4 | — | — |
| Example 24 | EVOH-1 | 27 | Crosslinking agent 8 | TAIC | Silica 1 | 60/40 | 8 | — | — |
| Example 25 | EVOH-1 | 27 | Crosslinking agent 8 | TAIC | Silica 1 | 60/40 | 12 | — | — |
| Example 26 | EVOH-1 | 27 | Crosslinking agent 8 | TAIC | Silica 1 | 60/40 | 6 | — | — |
| Example 27 | EVOH-2 | 24 | Crosslinking agent 8 | TAIC | Silica 1 | 60/40 | 6 | — | — |
| Example 28 | EVOH-3 | 44 | Crosslinking agent 8 | TAIC | Silica 1 | 60/40 | 6 | — | — |
| Comparative Example 1 | EVOH-1 | 27 | — | — | — | — | — | — | — |
| Comparative Example 2 | EVOH-1 | 27 | — | — | — | — | — | — | — |
| Comparative Example 3 | EVOH-1 | 27 | Crosslinking agent 8 | TAIC | Silica 1 | 60/40 | 0.4 | — | — |
| Comparative Example 4 | EVOH-1 | 27 | Crosslinking agent 8 | TAIC | Silica 1 | 60/40 | 16 | — | — |
| Comparative Example 5 | EVOH-1 | 27 | Crosslinking agent 15 | — | Silica 1 | 0/100 | 6 | — | — |
| Comparative Example 6 | EVOH-1 | 27 | Crosslinking agent 16 | — | Diatom earth | 0/100 | 6 | — | — |
| Comparative Example 7 | EVOH-1 | 27 | Crosslinking agent 17 | TAC | — | 100/0 | 6 | — | — |
| Comparative Example 8 | EVOH-1 | 27 | Crosslinking agent 18 | TAIC | — | 100/0 | 6 | — | — |
| Comparative Example 9 | EVOH-1 | 27 | Crosslinking agent 19 | GMAE | Silica 1 | 50/50 | 6 | — | — |
| Comparative Example 10 | EVOH-1 | 27 | Crosslinking agent 20 | DAM | Silica 1 | 50/50 | 6 | — | — |
| Comparative Example 11 | EVOH-1 | 27 | Crosslinking agent 21 | TMPDAE | Silica 1 | 50/50 | 6 | — | — |
| Comparative Example 12 | EVOH-1 | 27 | Crosslinking agent 22 | TAIC*2 | Silica 1*2 | 50/50 | 6 | — | — |

*1 Amount (part by mass) of crosslinking agent or hindered phenol compound relative to 100 parts by mass of EVOH
*2 TAIC not impregnated into silica

TABLE 3

| | Gel fraction (%) | Hot water resistance | | OTR (cc/m$^2$ · day · atm) | | Interlayer adhesiveness | Appearance characteristics |
|---|---|---|---|---|---|---|---|
| | | Monolayer | Multilayer | Before retorting | After retorting | | |
| Example 1 | 31 | B | A | 0.3 | 1.6 | A | C |
| Example 2 | 33 | B | A | 0.3 | 1.5 | A | C |
| Example 3 | 37 | B | A | 0.3 | 1.4 | A | C |
| Example 4 | 23 | B | B | 0.3 | 1.8 | A | C |
| Example 5 | 35 | B | A | 0.3 | 1.5 | A | C |
| Example 6 | 40 | A | A | 0.3 | 1.2 | A | C |
| Example 7 | 44 | A | A | 0.3 | 1.2 | A | C |
| Example 8 | 46 | A | A | 0.3 | 1.1 | A | C |
| Example 9 | 51 | A | A | 0.4 | 1.2 | B | C |
| Example 10 | 58 | A | A | 0.5 | 1.4 | B | C |
| Example 11 | 45 | A | A | 0.3 | 1.2 | A | B |
| Example 12 | 46 | A | A | 0.3 | 1.1 | A | C |
| Example 13 | 45 | A | A | 0.3 | 1.1 | A | B |
| Example 14 | 45 | A | A | 0.3 | 1.1 | A | A |
| Example 15 | 43 | A | A | 0.3 | 1.2 | A | B |
| Example 16 | 39 | B | A | 0.3 | 1.5 | A | B |
| Example 17 | 43 | A | A | 0.3 | 1.2 | B | C |
| Example 18 | 44 | A | A | 0.3 | 1.1 | A | C |

TABLE 3-continued

| | Gel fraction (%) | Hot water resistance Monolayer | Hot water resistance Multilayer | OTR (cc/m² · day · atm) Before retorting | OTR (cc/m² · day · atm) After retorting | Interlayer adhesiveness | Appearance characteristics |
|---|---|---|---|---|---|---|---|
| Example 19 | 40 | A | A | 0.3 | 1.3 | B | C |
| Example 20 | 44 | A | A | 0.3 | 1.2 | A | C |
| Example 21 | 25 | B | B | 0.3 | 1.6 | A | B |
| Example 22 | 32 | B | A | 0.3 | 1.4 | A | B |
| Example 23 | 39 | A | A | 0.3 | 1.3 | A | C |
| Example 24 | 52 | A | A | 0.4 | 1.2 | A | C |
| Example 25 | 57 | A | A | 0.7 | 1.5 | B | C |
| Example 26 | 29 | B | A | 0.3 | 1.6 | B | C |
| Example 27 | 47 | A | A | 0.1 | 1.2 | A | C |
| Example 28 | 44 | A | A | 1.4 | 1.9 | A | B |
| Comparative Example 1 | 0 | C | C | 0.4 | 2.7 | A | A |
| Comparative Example 2 | 2 | C | C | 0.5 | 2.5 | A | A |
| Comparative Example 3 | 7 | C | B | 0.3 | 2.2 | A | B |
| Comparative Example 4 | 60 | A | A | 1.2 | 2.1 | B | D |
| Comparative Example 5 | 7 | C | C | 0.5 | 2.6 | A | C |
| Comparative Example 6 | 6 | C | C | 0.5 | 2.7 | A | C |
| Comparative Example 7 | 51 | A | B | 0.2 | 1.5 | C | C |
| Comparative Example 8 | 56 | A | B | 0.2 | 1.4 | C | C |
| Comparative Example 9 | 2 | C | C | 0.3 | 2.5 | A | B |
| Comparative Example 10 | 12 | C | B | 0.2 | 2.1 | A | B |
| Comparative Example 11 | 15 | C | B | 0.2 | 2.0 | A | B |
| Comparative Example 12 | 56 | A | B | 0.2 | 1.4 | C | C |

As is clear from the results shown in Table 3, in each film obtained using the resin composition according to the examples, the gel fraction was high, indicating sufficient progress of crosslinking. Therefore, each film of the examples exhibited excellent hot water resistance and a low OTR value, as well as favorable interlayer adhesiveness. To the contrary, the film obtained using the resin composition of the comparative examples exhibited a result inferior in any of the hot water resistance, OTR after retorting, and adhesiveness. In addition, in the examples in which the hindered phenol compound was appropriately added, the viscosity during melt kneading and melt molding was stable, so that a resultant crosslinked product was favorable in appearance. Particularly in the examples in which the hindered phenol compound having an amide bond was used, a resultant crosslinked product was particularly excellent in appearance characteristics.

INDUSTRIAL APPLICABILITY

A resin composition of the present invention can sufficiently suppress bleeding out of a crosslinking agent from a crosslinked product and realize a hygienic crosslinked product that is excellent in hot water resistance and interlayer adhesiveness. Therefore, the resin composition of the present invention can be suitably used for producing food packaging materials and other packaging materials. In addition, since no restriction is placed on EVOH (A) used, it is possible to form various crosslinked products.

The invention claimed is:

1. A resin composition comprising an ethylene-vinyl alcohol copolymer (A) and a crosslinking agent (B) with the crosslinking agent (B) in an amount of 0.6 to 15 parts by mass relative to 100 parts by mass of the ethylene-vinyl alcohol copolymer (A),
   the crosslinking agent (B) being a powder obtained by impregnating a porous body (BS) with a crosslinkable compound (BL) that has three or more polymerizable groups and a melting point of no greater than 40° C.
2. The resin composition according to claim 1, wherein the crosslinkable compound (BL) is a triazine derivative.
3. The resin composition according to claim 1, wherein the crosslinkable compound (BL) comprises carbonyl groups and the number of carbonyl groups is equal to or greater than the number of the polymerizable groups.
4. The resin composition according to claim 1, wherein the crosslinkable compound (BL) contains triallyl isocyanurate.
5. The resin composition according to claim 1, wherein the porous body (BS) includes at least one selected from the group consisting of silica, alumina, diatom earth, and activated carbon.
6. The resin composition according to claim 1, wherein the crosslinking agent (B) has a mass ratio (BL)/(BS) between the crosslinkable compound (BL) and the porous body (BS) of 20/80 to 80/20.
7. The resin composition according to claim 1, further comprising a hindered phenol compound (C) having an ester bond or an amide bond in an amount of 0.2 to 5 parts by mass relative to 100 parts by mass of the ethylene-vinyl alcohol copolymer (A).
8. The resin composition according to claim 7, wherein the hindered phenol compound (C) has an amide bond.
9. The resin composition according to claim 1, wherein the composition is capable of crosslinking with an activated energy ray.
10. A crosslinked product obtained from the resin composition according to claim 1.
11. A film formed of the crosslinked product according to claim 10.
12. A multilayered structure comprising a layer formed of the crosslinked product according to claim 10.
13. The multilayered structure according to claim 12, further comprising a polyurethane type adhesive layer.
14. A retort container comprising the multilayered structure according to claim 12 or 13.
15. A method for producing the resin composition according to claim 1, the method comprising:
   copolymerizing ethylene with a vinyl ester to give an ethylene-vinyl ester copolymer;
   saponifying the ethylene-vinyl ester copolymer to give an ethylene-vinyl alcohol copolymer (A); and mixing the ethylene-vinyl alcohol copolymer (A) with a crosslinking agent (B) that is a powder obtained by impregnating a porous body (BS) with a crosslinkable compound (BL) having three or more polymerizable groups and a melting point of no greater than 40° C., to give a mixture.

16. A method for producing the crosslinked product according to claim 10, the method comprising:

copolymerizing ethylene with a vinyl ester to give an ethylene-vinyl ester copolymer;

saponifying the ethylene-vinyl ester copolymer to give an ethylene-vinyl alcohol copolymer (A);

mixing the ethylene-vinyl alcohol copolymer (A) with a crosslinking agent (B) that is a powder obtained by impregnating a porous body (BS) with a crosslinkable compound (BL) having three or more polymerizable groups and a melting point of no greater than 40° C., to give a mixture; and irradiating the mixture obtained in the mixing step with an activated energy ray to obtain the crosslinked product.

* * * * *

UNITED STATES PATENT AND TRADEMARK OFFICE
CERTIFICATE OF CORRECTION

Page 1 of 1

PATENT NO. : 10,544,248 B2
APPLICATION NO. : 15/625474
DATED : January 28, 2020
INVENTOR(S) : Edgard Chow et al.

It is certified that error appears in the above-identified patent and that said Letters Patent is hereby corrected as shown below:

On the Title Page

Item (73), should read:
-- (73) Assignee: KURARAY CO., LTD., Okayama (JP) --

Signed and Sealed this
Thirty-first Day of March, 2020

Andrei Iancu
*Director of the United States Patent and Trademark Office*